(12) United States Patent
Pinto

(10) Patent No.: US 6,443,288 B1
(45) Date of Patent: Sep. 3, 2002

(54) EFFORT REDUCTION SYSTEM FOR THE ACTUATION OF THE CLUTCH PEDAL FOR MOTOR VEHICLES

(75) Inventor: Emygdio José Do Carmo Pinto, São Paulo (BR)

(73) Assignee: Volkswagen Do Brasil Ltda., Rio de Janeiro (BR)

( * ) Notice: Subject to any disclaimer, the term of this patent is extended or adjusted under 35 U.S.C. 154(b) by 0 days.

(21) Appl. No.: 09/851,329

(22) Filed: May 9, 2001

Related U.S. Application Data

(63) Continuation of application No. PCT/BR00/00055, filed on May 19, 2000.

(30) Foreign Application Priority Data

Sep. 10, 1999 (BR) .............................................. 9905185

(51) Int. Cl.[7] .................................................. G05G 1/14
(52) U.S. Cl. ...................................... 192/99 S; 74/518
(58) Field of Search ......................... 74/516, 518, 512; 192/99 S, 85 C, 99 R

(56) References Cited

U.S. PATENT DOCUMENTS

| | | |
|---|---|---|
| 4,372,178 A | 2/1983 | Ota |
| 4,624,152 A | 11/1986 | Stotz et al. |
| 4,846,012 A * | 7/1989 | Papenhagen et al. ......... 74/512 |
| 4,910,962 A | 3/1990 | Keane |
| 5,033,267 A | 7/1991 | Keane |
| 5,038,907 A | 8/1991 | Baumann |
| 5,215,176 A * | 6/1993 | Hamann ................... 192/99 S |
| 5,947,249 A * | 9/1999 | Tobiasz ................ 192/99 S X |
| 6,095,306 A * | 8/2000 | Hu et al. ................. 192/109 F |

FOREIGN PATENT DOCUMENTS

| | | |
|---|---|---|
| DE | 44 34 254 | 4/1995 |
| FR | 2 564 220 | 11/1985 |
| JP | 60056636 | 4/1985 |

OTHER PUBLICATIONS

Notification of Transmittal of the International Search Report or the Declaration (PCT/ISA/220) for PCT/BR00/00055.

PCT Request (PCT/RO/101) for PCT/BR00/00055.

* cited by examiner

*Primary Examiner*—Saul Rodriguez
(74) *Attorney, Agent, or Firm*—Smith, Gambrell & Russell, LLP

(57) ABSTRACT

A system for reducing the force to actuate the clutch pedal in automobiles is described, wherein the clutch-actuating pedal (2) is fixed to one end of an actuating arm (1), which has, at its other end, a pivot pin (3) as an integral part of the free end of the rod (4), the actuating arm (1) being further pivoted around a pivot pin (6) located between its ends and fixed to the vehicle body (not shown), so that a force applied on to the pedal (2) causes the pivot pin (3), provided at the other end of the actuating arm (1), to actuate, pressing the rod (4) of the plunger of the clutch master cylinder (5). This invention reduces the actuating force with a system in which the actuating arm (1), upon actuating the pedal (2), pivot pin (3) and, consequently, the lever arm (X), where the force on the rod is applied, describe a rotational path (A) around the pin (6). The component of the lever arm (X), which influences the moment applied to the pin (6), decreases as the lever arm follows the path (A), thus reducing the moment and the effort required from the driver to actuate the clutch. In addition, the master cylinder (5) itself is pivotable around a pin (9), fixed to the support (10) on the vehicle body, allowing the rod (4) to accommodate the pivot pin (3), when the latter follows the path (A), so as to enable the rod (4) to penetrate further into the master cylinder (5) of the clutch.

13 Claims, 6 Drawing Sheets

EFFORT REDUCTION SYSTEM FOR THE ACTUATION OF THE CLUTCH PEDAL FOR MOTOR VEHICLES

This application is a continuation of pending prior international application No. PCT/BR00/00055 filed on May 19, 2000, entitled EFFORT REDUCTION SYSTEM FOR THE ACTUATION OF THE CLUTCH PEDAL FOR MOTOR VEHICLES.

The invention refers to a system designed to reduce the force exerted by a driver of an automotive vehicle, especially in the case of heavy vehicles such as a truck, to actuate the clutch pedal.

As the load capacity of the trucks and consequently the power of the motors increases, it has become necessary to manufacture clutches having a greater pressure-plate load, which requires a greater effort on the part of the driver to actuate the clutch pedal.

The efforts of the prior art to solve this problem proved to be complex, expensive and, moreover, insufficient. An example of an attempt by the prior art to solve the problem is that described in U.S. Pat. No. 5,038,907, where a spring is used to exert force upon the clutch pedal so as to aid actuation. This system, however, is of complex construction and high cost, and does not provide good modulation in actuating the clutch.

Therefore, it is an objective of the invention to provide a system to reduce the force to actuate the clutch pedal in automobiles, particularly heavy vehicles such as trucks.

Another objective of the invention is to provide an inexpensive system that is not complex.

These objectives are achieved by this invention that provides a system reducing the force to actuate the clutch pedal in automobiles, which comprises an actuating arm provided at one end with a pedal and, at the other, with a pivot pin for the clutch master cylinder rod, the mentioned actuating arm being pivoted about a point located between its two ends, so that a force applied to the pedal causes the other end of the actuating arm to push the rod of the clutch master cylinder. The master cylinder itself is pivotable around at least one pin fixed on a vehicle body support, and the actuating arm, upon actuating the pedal, describes a rotational path for the pivot pin around the pivot point between the 2 ends of the actuating arm, so that the component of the lever arm that constitutes the moment applied to the pin between the ends of the actuating arm gradually decreases, thus reducing the moment applied to the pivot pin and the effort of the driver to actuate the clutch.

This invention is described below with reference to two embodiments, illustrated in the drawings in which.

DESCRIPTION OF THE PRIOR ART

Figure 1:
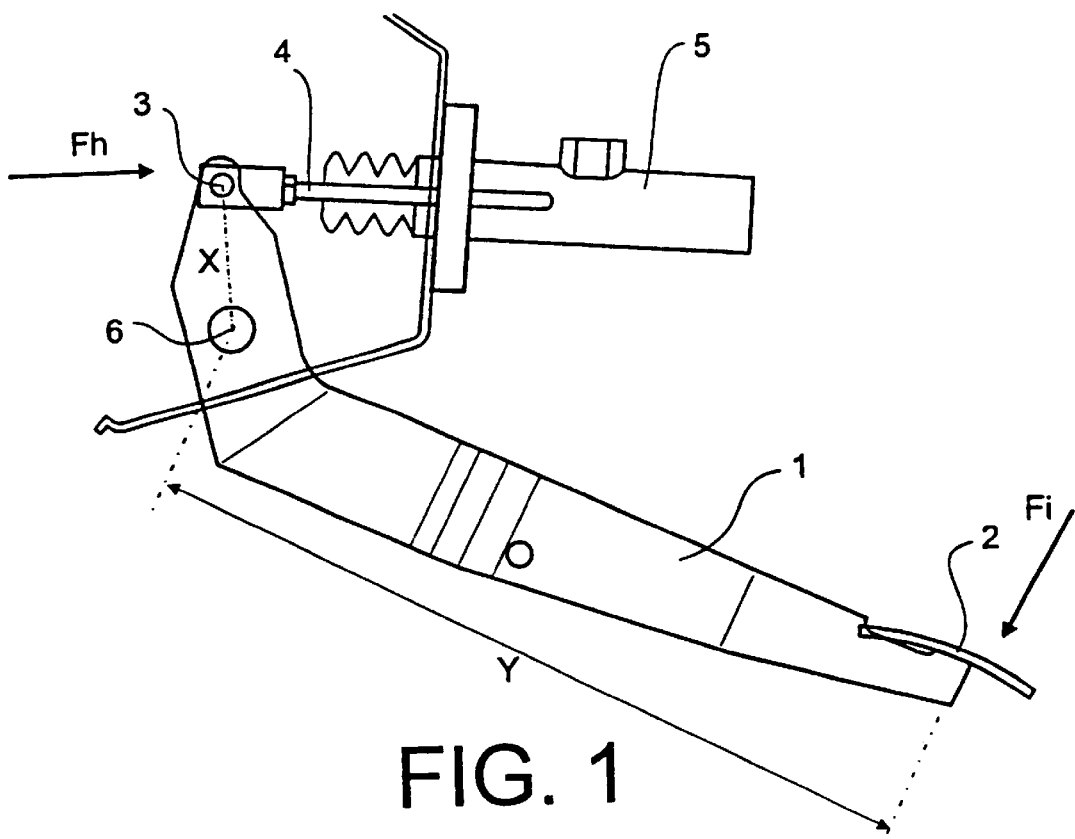
FIG. 1 is a schematic plane side view showing a clutch pedal typical of the prior art and in rest position, that is, without the pedal being pressed.
Figure 2:
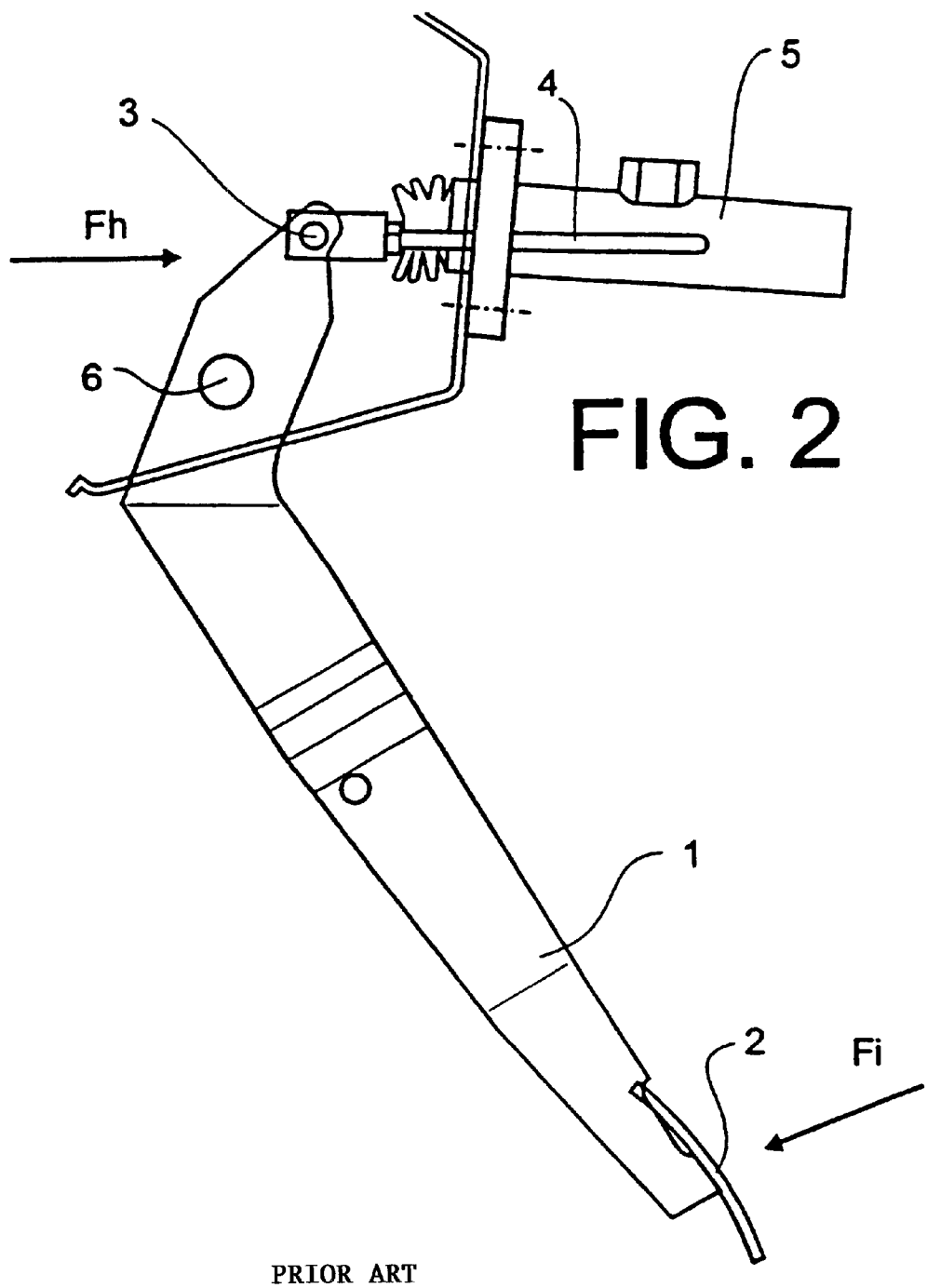
FIG. 2 is a view similar to FIG. 1, showing the pedal of the prior art in pressed or actuated position.

First, with reference to FIGS. 1 and 2 of the drawings that illustrate a conventional clutch pedal, one can see that the system is made up of an actuating arm 1 having, at one end, a pedal 2 to be actuated by the driver of the vehicle (not shown) and, at the other end, a pivot pin 3 coupled to the free end of the rod 4 of the clutch master cylinder 5. The actuating arm 1 is pivoted around a pivot pin 6, at a point located between the two ends.

When the pedal is pressed, assuming the position illustrated in FIG. 2, the actuating arm 1 pivots around the pivot pin 6, thus causing the pivot pin 3 situated at the other end of the arm 1 to push the rod 4 of the master cylinder 5, thereby actuating the clutch.

There is still a spring or the like actuating to maintain the pedal in its rest or non-pressed position. This spring has been omitted in this specification as well as in the drawings for the sake of a better view of the drawings and because it is not part of this invention.

In an environment of the prior art, the moment exerted by the driver to actuate the plunger 4 of the master cylinder 5 is constant from beginning to end of the movement and can be expressed by the equation I below.

$$Fi \times Y = Fh \times X, \qquad \text{I}$$

wherein Fi is the force actuating on the arm 1; Fh is the force on the rod 4 of the plunger of the master cylinder 5; X is the distance between the longitudinal axes of the pins 3 and 6; and Y is the distance between the pedal 2 and the pivot pin 6 of the actuating arm.

This pedal-actuating force, taking an average of the trucks on the market these days, ranges from 18 kgf for light trucks, 22 kgf for medium trucks and 25 kgf for heavy trucks, when they are new. With use, that force may increase by up to about 30% (thirty percent) above the initial value, due to the wear of the friction material, wear of the joints and loss of lubrication.

DESCRIPTION OF THE INVENTION

The system illustrated in FIGS. 1 and 2 having been described, the preferred embodiments of the invention will now be described, illustrated in FIGS. 3–6, where the reference numbers designating parts common to the system in both the prior art and the present are maintained in order to facilitate understanding.

Figure 3:
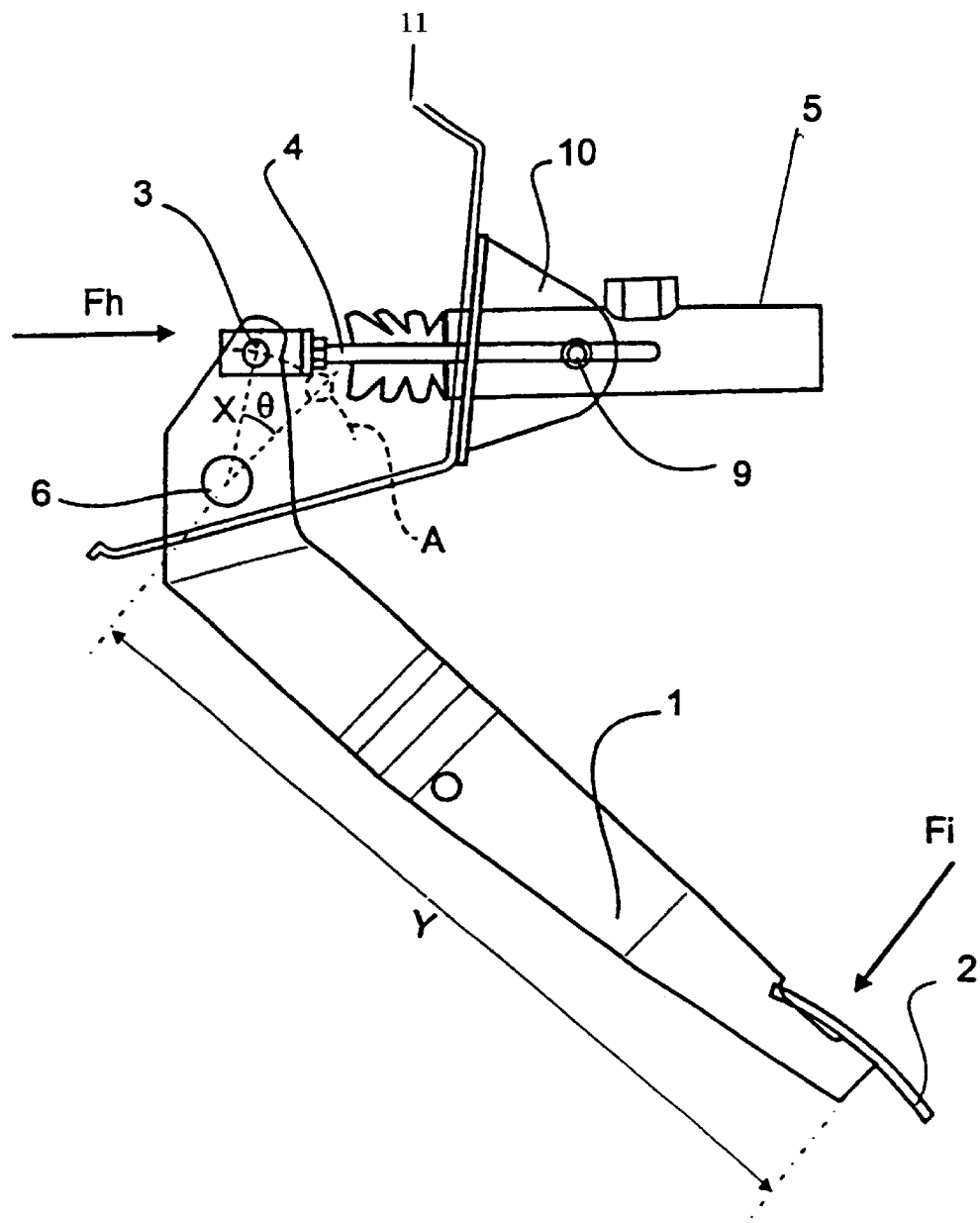
FIG. 3 is a schematic plane side view of a clutch pedal in a first embodiment, incorporating the teachings of this invention, in rest position.
Figure 4:
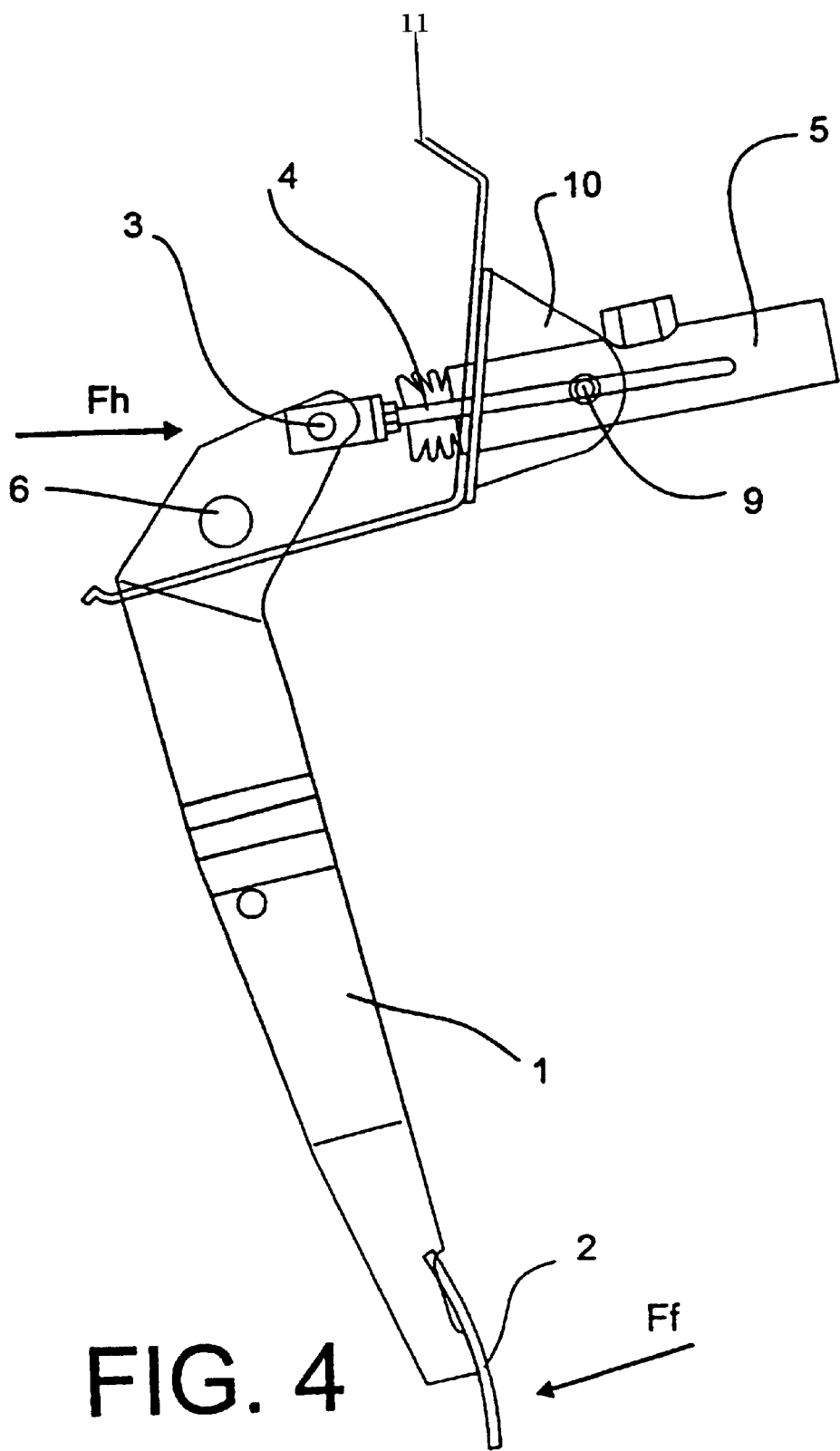
FIG. 4 is a view similar to FIG. 2 showing the pedal of the first embodiment in pressed or actuated position of the clutch.

A first embodiment of the system of this invention can be seen in FIGS. 3 and 4. The system comprises, two pins 9 on the master cylinder 5 driven in the support 10, the pins 9 turning freely inside the housing of the master cylinder 5. The cylinder 5 being consequently pivotable around the pins 9.

In operation, when the pedal 2 is pressed by the driver, the actuating arm 1 pivots around the pivot pin 6 that is fixed to the vehicle body 11. This causes the other end of the actuating arm 1, provided with pivot pin 3, to push the rod 4 of the clutch master cylinder 5 into the latter. Throughout this movement, the pivot pin 3 follows a rotational path A (FIG. 3) around the pivot pin 6 of the actuating arm. While following the rotational path, the pivot pin 3 is accommodated by the clutch master cylinder 5, so as to enable the rod 4 to penetrate further into the clutch master cylinder 5.

Along this rotational path A of the pivot pin 3, the lever arm X turns around the pivot pin 6 and subtends an angle θ, as shown in FIG. 3, between its initial position (before the clutch pedal 2 is pressed) and its position at any point whatever along the path (while pressing the pedal 2). As the lever arm turns along the path A, the angle θ increases and the component of the lever arm X, which is perpendicular to the rod 4 of the master cylinder 5, gradually decreases. The component, together with the force Fh applied to the rod 4, gives rise to the moment applied to the pivot pin 6. Therefore, the gradual decrease of the component causes a gradual decrease in moment on the pivot pin 6 and, consequently, a decrease in the effort made by the driver upon actuating the clutch pedal. The above description can be clearly seen by means of the relationships indicated below.

As already seen above, equation I $$Fi \times Y = Fh \times X, \qquad \qquad \text{I,}$$

On the other hand, according to this embodiment, as explained above, the component of the lever arm X, which is perpendicular to the rod 4, decreases as the angle θ increases. Therefore, according to the trigonometry, the component is equal to the lever arm X multiplied by the cosine of θ. Then, from equation I it follows that:

$$Fi \times Y = Fh \times X \times \cos\theta, \qquad \qquad \text{II,}$$

causing the value of the final pedal-actuating force Ff to be given by equation III below:

$$Ff = Fh \times X \times (\cos\theta)/Y \qquad \qquad \text{III,}$$

where Ff depends upon θ. The reduction of the actuating effort is represented by the following equation IV:

$$\text{Reduction of the effort} = 1 - Ff/Fi \qquad \qquad \text{IV.}$$

Finally, the lever arm X of this embodiment has been designed with reduced dimensions, compared with those of the state of the art system, so as to contribute to a decrease in the moment applied on the pin 6 as well.

This reduction of effort, achieved by the system in this invention, if applied to vehicles in operation today, is in the order of 30% (thirty percent).

Figure 5:
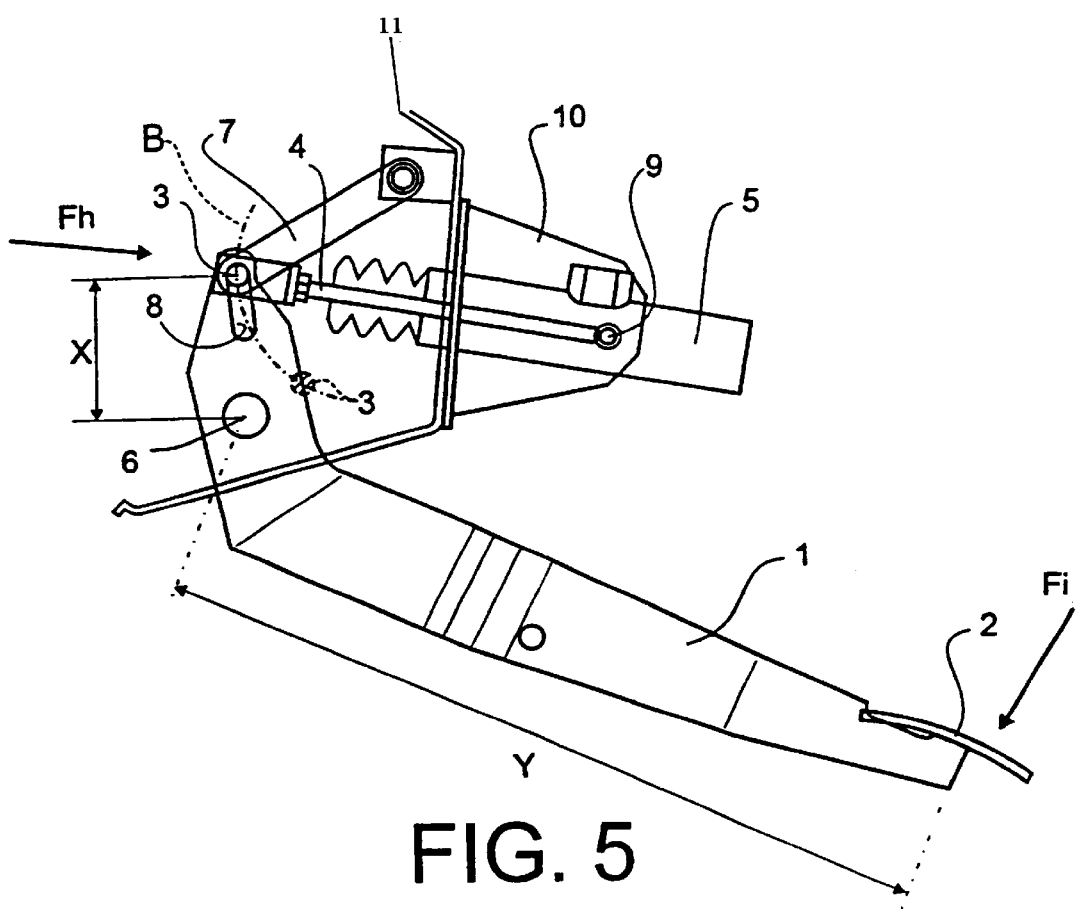
FIG. 5 is a schematic plane side view of a clutch pedal of a second embodiment, incorporating the teachings of this present invention, in rest position.
Figure 6:
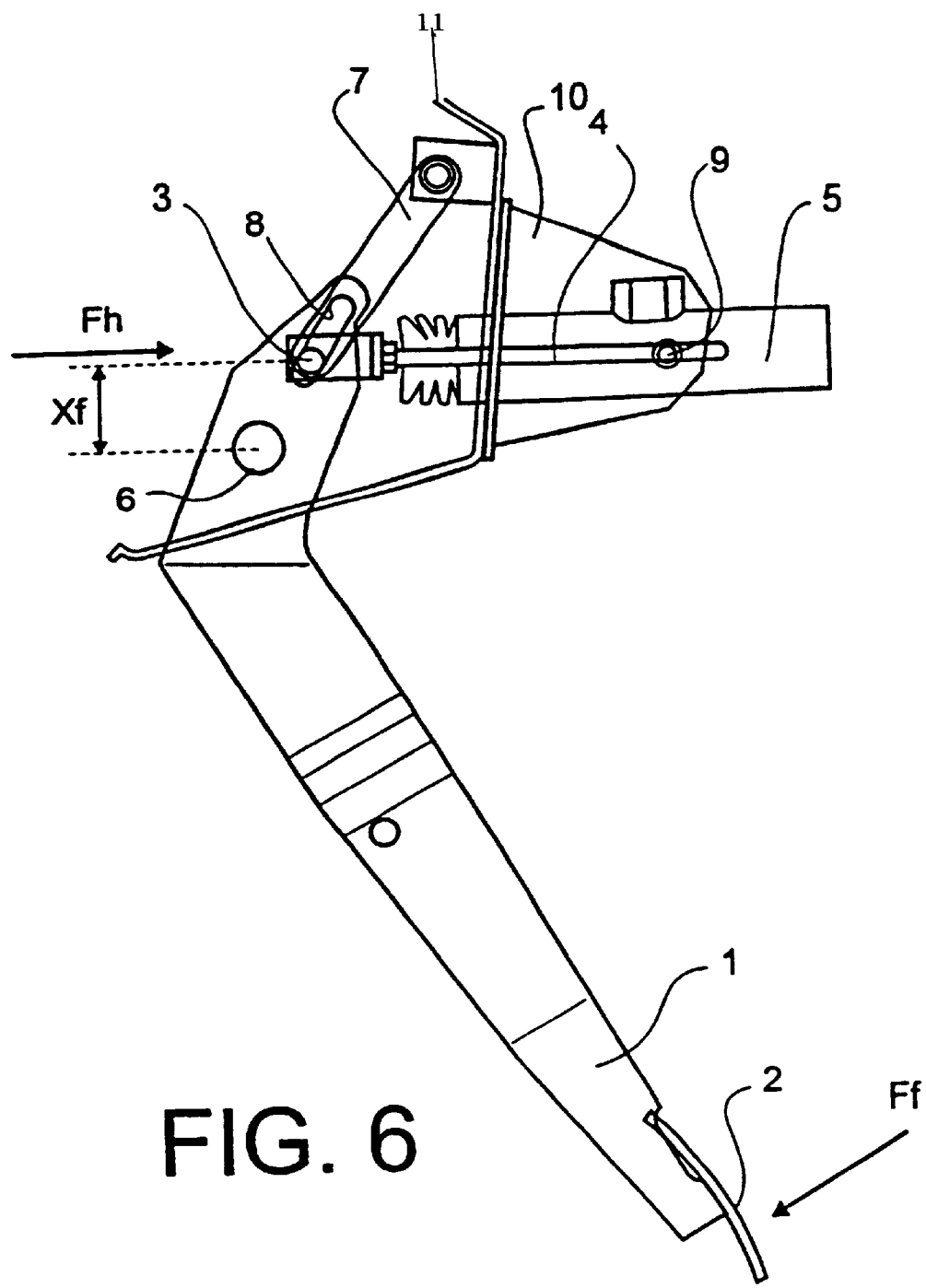
FIG. 6 is a view similar to FIG. 2, showing the pedal of the second embodiment in pressed or actuated position.

FIGS. 5 and 6 illustrate a second embodiment of the system of the invention, wherein the system comprises, at the other end of the actuating arm 1, a connecting means to link the rod of the clutch master cylinder, consisting, in addition to the pivot pin 3 itself, an integral part of the other end of the actuating arm 1, a direction means that includes a pivot guide-bar 7, fixed at one end of its ends to the vehicle body 11, and, at the opposite end, to the pivot pin 3 and a slot 8 provided in the actuating arm 1 and through which the pivot pin 3 extends. The slot 8 extends from the actuating arm 1 to a point close to the pivot pin 6 of the arm 1.

The clutch master cylinder utilized by the invention is pivotable around two pins 9 driven into the support 10. The pins 9 turn freely inside the housing of the master cylinder In operation, when the pedal 2 is pressed by the driver, the actuating arm 1 pivots around the pivot pin 6, causing its other end, provided with the pivot pin 3, to push the plunger rod of the clutch master cylinder 5 into the latter. This movement of the pivot pin 3, however, is guided under the action of the guide-bar 7 combined with the slot 8, so that the pin will move close to the pivot pin 6 of the actuating arm 1, in reality following the curved path B indicated in FIG. 5. This curved movement of the pivot pin 3 is accommodated by the pivoting of the clutch master cylinder 5, so that the rod 4, just as in the first embodiment, will penetrate further into the cylinder 5.

The progressive decrease in the distance between the pivot pin 3 and the pivot pin 6, in effect, reduces the lever arm to which the force Fh is applied on the plunger rod 4 of the master cylinder 5, thus reducing the value of the moment and, consequently, the effort made by the driver to actuate the clutch pedal, as can be clearly seen in the relationships indicated below:

As already seen above, from equation I $$Fi \times Y = Fh \times X, \qquad \qquad \text{I}$$

results in the following equation V $$Fi = Fh \times X/Y \qquad \qquad \text{V}$$

On the other hand, according to the second embodiment explained above, the value of X decreases as the pedal 2 is pressed (making Xf<X), causing the value of the final pedal-driving force Ff to be given by the equation VI below:

$$Ff = Fh \times Xf/Y \qquad \qquad \text{VI}$$

wherein Ff is less than Fi. The reduction of the actuating effort is represented by the following equation VII:

$$\text{Reduction} = 1 - Ff/Fi \qquad \qquad \text{IV}$$

The reduction of effort achieved by this embodiment of the system is similar to that achieved by the first embodiment.

It should be rememebered that only two preferred embodiments of the invention have been described above, various others being possible, without departing from the inventive concept to be protected, which is only limited by the accompanying claims.

What is claimed is:

1. A system for reducing the force to actuate a clutch pedal in a vehicle, wherein a clutch-actuating pedal (2) is fixed to one end of an actuating arm (1), which has, at its other end, a first pivot pin (3) of a rod (4) of a clutch master cylinder (5), the actuating arm (1) being further pivoted around a second pivot pin (6) located between the first pivot pin (3) and the pedal (2), and fixed to a vehicle body (11), so that a force applied to the pedal (2) causes the first pivot pin (3), provided at the other end of the actuating arm (1), to actuate, pressing the rod (4) of the clutch master cylinder (5); the system being characterized in that the master cylinder (5) itself is pivotable around at least one pin fixed to a support (10) on the vehicle body (11).

2. A system according to claim 1, characterized in that the master cylinder (5) is pivotable around two pins (9) fixed to the support (10).

3. A system according to claim 2, characterized in that the two pins (9) are driven into the support (10) and turn freely inside the body of the master cylinder (5).

4. A system for reducing the force to actuate a clutch pedal in a vehicle, wherein a clutch-actuating pedal (2) is fixed to one end of an actuating arm (1), which has, at its other end, a connecting means for linking to a rod (4) of a clutch master cylinder (5), the connecting means comprising a first pivot pin (3), which is an integral part of a free end (12) of the rod (4), the actuating arm (1) being further pivoted around a second pivot pin (6) located between the first pivot pin (3) and the pedal (2), and fixed to a vehicle body (11), so that the force applied to the pedal (2) causes the fist pivot pin (3), provided at the other end of the actuating arm (1), to actuate, pressing the rod (4) of the clutch master cylinder (5); the system being characterized by the fact that the connecting means for linking to the rod (4) of the clutch master cylinder (5) further comprises a guiding means (7,8) cooperating with the first pivot pin (3) and that defines a path (A) for the first pivot pin (3), upon actuating the pedal (2), the path (A) extending from the other end of the actuating arm (1) to a point closer to the second pivot pin (6) of actuating arm (1); and the master cylinder (5) itself is pivotable around pin (9) fixed to its side wall and to the vehicle body (11).

5. A system according to claim 4, characterized by the fact that the direction means consists of a guide-bar (7), pivotally fixed at one of its ends to the vehicle body and, at the opposite end, to the first pivot pin (3); and a slot (8) provided in the actuating arm (1) and through which the first pivot pin (3) extends, the slot (8) extending from the other end of the actuating arm (1) to a point closer to the second pivot pin (6) of the arm (1).

6. A system for reducing the force to actuate a foot pedal of a vehicle, comprising:

a foot pedal;

an actuating arm having a first end with the foot pedal, a second end, and an intermediate section positioned between said first and second ends;

a first pivot pin which is received by the second end of said actuating arm;

a second pivot pin which is received by the intermediate section of said actuating arm such that said actuating arm is pivotable about a central axis of said second pivot pin;

a master cylinder, with said first pivot pin being provided at a first end of said master cylinder such that the first end of said master cylinder is pivotable about a central axis of said first pivot pin and relative to the second end of said actuating arm;

a support;

a third pivot pin supported by said support and extending to said master cylinder such that said master cylinder is pivotable relative to said support and about a central axis of said third pivot pin which is spaced from the central axis of said first pivot pin.

7. The system of claim 6 further comprising a guide lever having a first end pivotably supported by a supporting member and a second end extending to said second pin and being in a pivoting relationship relative to said first pin and the second end of said actuating arm.

8. The system of claim 7 wherein the second end of said actuating arm has an elongated slot within which said first pin is slidable.

9. The system of claim 6 wherein the master cylinder has an actuating rod which supports said first pin at a free end of said actuating rod.

10. The system of claim 6 wherein the master cylinder is a clutch master cylinder.

11. The system of claim 10 further comprising a guide lever having a first end pivotably supported by a supporting member and a second end extending to said second pin and being in a pivoting relationship relative to said first pin and the second end of said actuating arm.

12. The system of claim 11 wherein the second end of said actuating arm has an elongated slot within which said first pin is slidable.

13. The system of claim 10 wherein the clutch master cylinder has an actuating rod which supports said first pin at a free end of said actuating rod.

* * * * *